(12) United States Patent
Balmakhtar et al.

(10) Patent No.: US 12,413,626 B2
(45) Date of Patent: Sep. 9, 2025

(54) QUALITY OF TRUST FRAMEWORK FOR WIRELESS COMMUNICATION NETWORKS

(71) Applicant: T-MOBILE INNOVATIONS LLC, Overland Park, KS (US)

(72) Inventors: Marouane Balmakhtar, Fairfax, VA (US); Serge M. Manning, Plano, TX (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 200 days.

(21) Appl. No.: 18/171,982

(22) Filed: Feb. 21, 2023

(65) Prior Publication Data
US 2024/0283825 A1    Aug. 22, 2024

(51) Int. Cl.
| | |
|---|---|
| H04L 29/06 | (2006.01) |
| G06Q 10/0639 | (2023.01) |
| H04L 9/40 | (2022.01) |
| H04L 41/0894 | (2022.01) |

(52) U.S. Cl.
CPC ....... *H04L 63/20* (2013.01); *G06Q 10/06393* (2013.01); *H04L 41/0894* (2022.05)

(58) Field of Classification Search
CPC ..... H04L 63/10; H04L 63/107; H04L 63/108; H04L 63/20; H04L 41/0894; H04W 12/08; G06Q 10/06393
See application file for complete search history.

(56) References Cited

U.S. PATENT DOCUMENTS

| | | | |
|---|---|---|---|
| 11,876,688 B1* | 1/2024 | Rehman | H04L 41/0894 |
| 12,003,565 B1* | 6/2024 | Bai | H04L 41/5022 |
| 2020/0313985 A1* | 10/2020 | Jayakumar | H04L 41/14 |
| 2021/0135780 A1* | 5/2021 | Chang | H04L 1/0018 |
| 2023/0014207 A1* | 1/2023 | Hanbaly | H04W 36/0058 |
| 2023/0065207 A1* | 3/2023 | Wang | H04L 43/0858 |
| 2024/0046191 A1* | 2/2024 | Mokashi | G06Q 10/06393 |
| 2024/0111858 A1* | 4/2024 | Neystadt | G06F 21/552 |

* cited by examiner

*Primary Examiner* — Joseph P Hirl
*Assistant Examiner* — Chi D Nguy

(57) ABSTRACT

Systems, methods, and devices are disclosed herein to identify and deploy policy changes from a policy source in a wireless communication network to enforcement points in the network based on trends identified by the policy source in KPIs reported by the enforcement points. In an implementation, enforcement points in the network report KPIs to the policy source. The KPIs are related to authorization attempts made by user equipment in the network. The policy source, upon receiving the KPIs, identifies a trend in the KPIs and identifies a policy change based on the KPIs. The policy source then deploys the policy change to the enforcement points. In various implementations, the policy source is a Policy Decision Point (PDP), and the enforcement points are Policy Enforcement Points (PEPs).

20 Claims, 9 Drawing Sheets

QUALITY OF TRUST FRAMEWORK FOR WIRELESS COMMUNICATION NETWORKS

TECHNICAL FIELD

Aspects of the disclosure are related to the field of wireless communication networks, particularly security policy frameworks for controlling access.

BACKGROUND

Fifth generation (5G) communication networks rely on security policy frameworks to allow authorized access to network resources (e.g., data, devices, or services). The logical components of a policy framework include a policy decision point (PDP) and a policy enforcement point (PEP). When a user, device or service requests access to a network resource, the PEP protects the network resource by controlling access to it. To control access, the PEP relies on access control decisions made by the PDP. The PDP evaluates the request for access according to the security policies to determine whether access is authorized.

In a policy framework, the security policies are organized to control access according to the level of protection required for the resource, privileges of the requester, and environmental conditions that can change the allowed behavior of the requester with respect to the resource. The PDP evaluates the parameters of the request against the security policies to determine whether the requester should be allowed access to the resource, then transmits the authorization decision to the PEP to implement that decision (e.g., allow or deny access).

In a service-based architecture, various aspects of the security policy framework are implemented in a number of network functions. For example, the PEP function may be performed by a User-Plane Function (UPF), and the PDP may be embodied in multiple network functions, such as the UDM (Unified Data Management), the PCF (Policy Control Function), the AMF (Access and Mobility Function), the SMF (Session Management Function), and so on. For example, broadly speaking, the UDM validates the identity of the requester and authorizes access, while the PCF provides policy rules for control and data plane functions (e.g., network slicing, Quality of Service, roaming, and mobility restrictions). A PDP may control multiple PEPs.

Each entity in control of a security domain of a communication network, such as mobile network operators (MNOs), mobile virtual network operators (MVNOs), or enterprise resource providers, controls communication traffic in its domain according to its access control policies. With multiple entities in control of the network resources necessary for end-to-end communication, interactions between different policy rules may have a global impact on network communication health. Management of the 5G network communication is further complicated by the specific performance requirements of the various 5G network slices, which are a key feature of 5G networks. Network slices are virtual networks executing on the physical network infrastructure. Each network slice can be tailored to meet the specific requirements of a particular set of users or services, such as ultralow latency for critical real-time control systems or high bandwidth for mobile broadband.
Technical Overview Systems, methods, and devices are disclosed herein to operate a wireless communication network including enforcement points and policy sources. In an implementation, the enforcement points of the wireless network apply an access control policy with respect to access attempts initiated by user equipment and associated with network slices in the wireless network. The enforcement points gather key performance indicators (KPIs) which are indicative of the results of the access attempts with respect to the network slices and send the KPIs to the policy source. The policy source identifies a trend in the KPIs received from the enforcement points relating to an aspect of the access control policy associated with a network slice. The policy source identifies a change to the access control policy based on the trend. The policy source sends the change to the enforcement points.

In an implementation, upon receiving the policy change from the policy source, the enforcement points update the access control policy based on the change, generating an updated access control policy. The enforcement points then apply the updated access control policy to new access attempts.

In some implementations, the policy source generates an aggregate KPI based on KPIs from the enforcement points and sends the aggregate KPI to a second policy source. The policy source receives from the second policy source a change to the access control policy based on a trend identified by the second policy source relating to the aggregate KPI. The policy source sends the change to the enforcement points.

DETAILED DESCRIPTION

Figure 1:
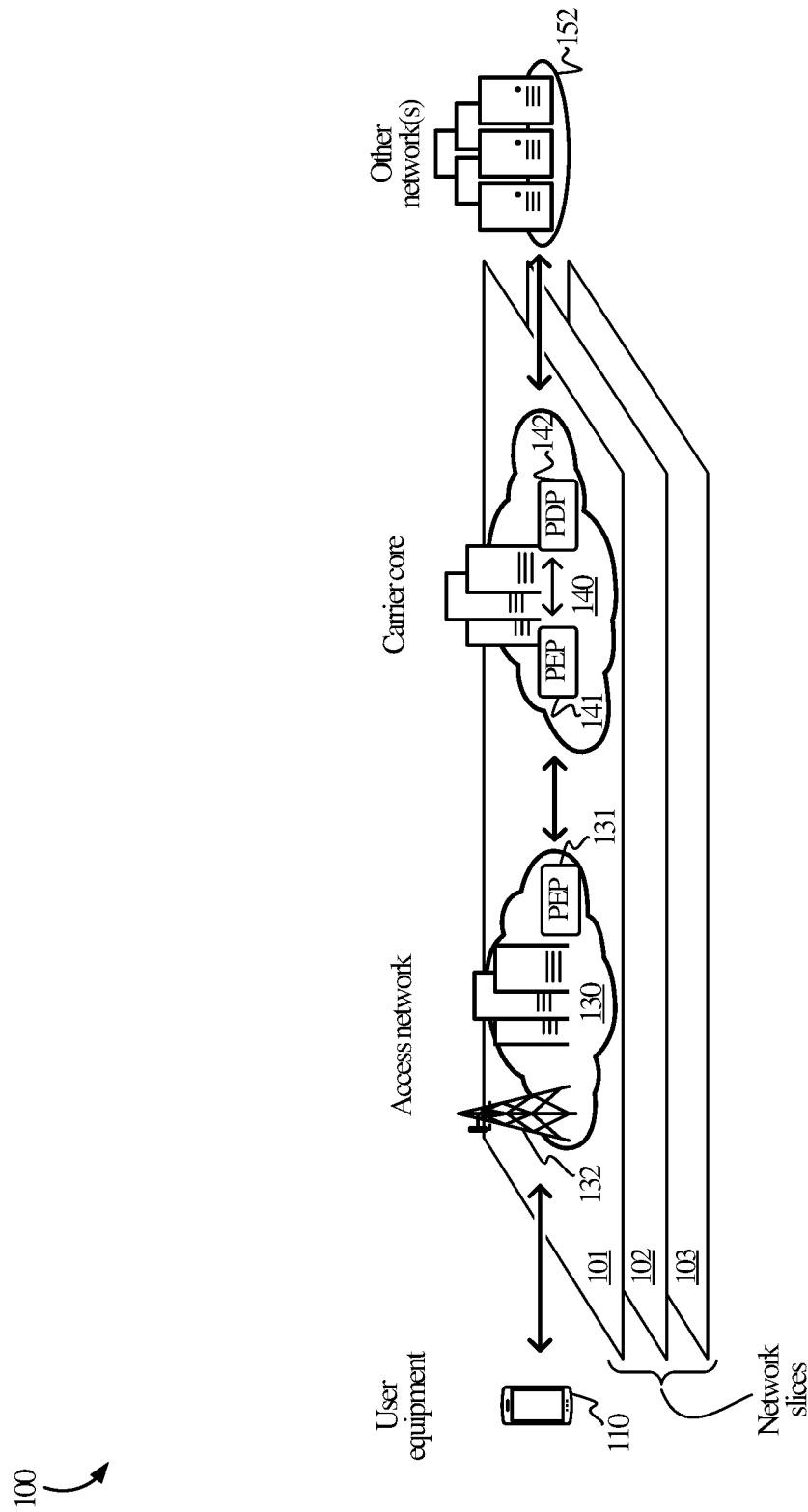
FIG. 1 illustrates an operational environment of a wireless communication network in an implementation.

Systems, methods, and devices are disclosed herein to identify and deploy policy changes from a policy source in a wireless communication network to enforcement points in the network based on trends identified by the policy source in KPIs relating to access attempts associated with network slices. In an implementation, the enforcement points apply an access control policy with respect to attempts to access the network and report KPIs indicative of the results of the access attempts with respect to the network slices to the policy source. The policy source, upon receiving the KPIs, identifies a trend in the KPIs relating to an aspect of the access control policy associated with a network slice and identifies a policy change based on the trend. The policy source then deploys the policy change to the enforcement points. In various implementations, the policy source is a Policy Decision Point (PDP), and the enforcement points are Policy Enforcement Points (PEPs).

In some implementations, the policy source or PDP sends to the enforcement points or PEPs instructions relating to KPIs to be configured by and transmitted by the PEPs to the PDP. The KPIs are associated with network slices and may include metrics relating to network security, e.g., rate of successful authorizations or authentications, or metrics relating to network performance or Quality of Service (QoS), e.g., the number of times a user's data consumption was throttled for exceeding the bandwidth for his or her class of service in a given period of time. The KPIs may also relate to intercepting security threats, such as detecting bots or malicious actors attempting to access the network, which may be indicated by a high frequency of authentication attempts from a single IP address. The PDP instructs the PEPs to periodically calculate the KPIs based on the results of the access attempts, configure the KPIs into a data object such as a vector, file, or other container, and transmit the KPI data to the PDP.

In some implementations, the multiple PDPs of a wireless network form a hierarchy. Low-level PDPs in communication with PEPs at the edge of the communication network may report to a higher level PDP in the hierarchy. Upon receiving the KPIs from PEPs within the scope of its control, the low-level PDP configures a set of KPI data or heuristics based on the KPI data received from the PEPs. The low-level PDP collects or aggregates a set of KPIs over a given period of time, for a particular endpoint or set of endpoints, or relative to some other request parameter. The low-level PDP transmits the aggregate KPI data to the higher level PDP which receives similarly aggregated information from other low-level PDPs. The higher level PDP identifies a trend in the aggregate KPI data, determines a policy change based on the trend, and pushes the policy change down to the low-level PDPs. The low-level PDPs then deploy the policy change to the respective PEPs.

It may be appreciated that a hierarchy of PDPs can include multiple layers of PDPs which receive KPIs or aggregate KPI data from lower level PDPs and which configure a policy change that is pushed down the hierarchy ultimately to be implemented by the PEPs at the edge of the network. Continuing the exemplary scenario described above, multiple higher-level PDPs may report to a "global" PDP which performs a higher level analysis of the aggregate KPI data. Thus, as a hierarchy, the PDPs respond to trends in access attempts according to the scope of the trend. For example, low-level PDPs may identify and respond to localized or isolated trends occurring at the PEPs of a few access nodes or edge networks of a particular geographic location. Alternatively, higher level PDPs may identify broader trends from aggregate KPI data gathered across multiple edge and/or core networks.

As logical elements of the policy framework for network communication, the PEPs in the wireless communication network receive requests to access a network slice of the network from user devices such as smartphones, laptops, IoT (Internet of Things) devices, autonomous vehicles and other devices, and so on. The requesting device may request access to, for example, a third-party application server or database or to another communication network, such as when a caller roams onto a foreign communication network.

In accordance with ZTA principles, the PEPs are gatekeepers of the communication network resources. The PEPs and PDPs are located throughout the network. For example, an access or edge network may include PEPs and PDPs to control user and device access to a core network. The core network may include PEPs and PDPs to control access to applications and data center infrastructure as well as outsourced infrastructure. PEPs and PDPs may control access between the core network and a provider network (e.g., for Internet access). The provider network may include PEPs and PDPs to control access to applications and cloud services.

The PEPs implement access control decisions based on the access control policies of various network stakeholders, such as MNOs, MVNOs, and other enterprises. The access control policies are fed to the PEPs by the PDPs in the network. In a software-defined wireless network, the PDPs may be embodied in network functions such as UDMs, PCFs, AMFs, SMFs. In some implementations, the access control policies are configured as sets of rules, with each rule generally including attributes (which are matched to the parameters of the request, such as the identity of the requester), instructions for an action to be taken by the PEP, the resource to which the request applies, the type of access allowed, conditions on access, obligations (i.e., directives to the PEP on what must be carried out before or after access is approved), and so on.

The PEPs transmit parameters of the request to a PDP which applies one or more access control policies to make a determination regarding access, that is to say, to allow or deny the request. The PDP relays the determination to the PEP to implement. In some scenarios, the PDP supplies the policy rule or ruleset to the PEP which allows the PEP to make the determination on access without consulting the PDP for every access request. If the PEP receives a request beyond the scope of the policies provided, it will relay the parameters of the request to the PDP for a determination. In response, the PDP will identify or configure the appropriate policy and relay it to the PEP to implement. The PEP may store the newly received policy for future use. Occasionally, in some implementations, the PDP pushes new policies received from other PDPs or from the PDP's policy administration point (PAP) or other policy authority to the PEP for implementation.

Authorization decisions with respect to access requests are made based on policies defined according to user device subscription status, device type, device location, service access policies, Quality of Service (QoS) policies, security policies, and time-based policies (e.g., time-of-day usage rules). Policies may also relate to network communication protocols, network traffic granularity, network slicing, transaction type, application type, and so on.

Policies relating to network communication protocols may be defined according to an interconnect model which provides a framework for standardizing network communication in terms of layers of operation. In an implementation, policies are defined according to layers of the Open Systems Interconnection (OSI) model, a seven-layer protocol stack for network communication including the physical layer, the data link layer, the network layer, the transport layer, the session layer, the presentation layer, and the application layer. In other implementations, policies are defined according to other protocols, such as the Internet Protocol (IP), Transmission Control Protocol (TCP), or User Datagram Protocol (UDP). Policies may also be defined by layer-specific protocols. For example, the application layer of the OSI model may include the HTTP protocol, the FTP protocol, and so on. Thus, the policies defined according to the layers of a protocol stack control a particular aspect or functionality of network communication by the user device.

Policies for controlling access by network traffic can be defined in terms of traffic granularity classifications. Traffic granularity refers to classifying network data traffic by the level of detail of the classes. For example, moving from coarse to fine (or broad to narrow) classifications, network data traffic can be classified according to MAC addresses, IP addresses, IP flow, TCP connections, and ports.

In an implementation, one or more PEPs serving a PDP may relay to the PDP metrics or KPIs relating to network performance or network security with respect to the network slices of the access requests. Security- or trust-related KPIs include device registration data and metrics, authentication or authorization success or failure rates; percentage of secure connections, such as by encryption or other security mechanisms; malicious traffic detection rate, such as a percentage of time a network is able to detect and block malicious traffic; vulnerabilities and patching rate, relating to a rate at which vulnerabilities are discovered and patched; compliance with security standards, relating to the degree to which the network adheres to relevant security standards and regulations (e.g., 3GPP—$3^{rd}$ Generation Partnership Project—security standards); incident response time; security audit and penetration testing, such as a frequency of audits and testing to identify vulnerabilities and to measure the overall security or Quality of Trust of the network; security monitoring relating to detecting and responding to security incidents; network segmentation relating to the degree to which the network is segmented and isolated to prevent unauthorized access and security breaches; intrusion detection and prevention; and so on.

Other security- or trust-related KPIs relayed by the PEPs to the PDP can include, for a few examples: for each active policy rule, the number or rate of violations; the number or rate of failed authentications or intrusion attempts; the number or rate of successful authentications; the number of OAuth token requests (passed or failed) for a particular API; or the number or rate of packets received from unidentified device. Still other KPIs reported by the PEPs to a PDP may relate to detecting bots or malicious endpoints. For example, a PDP may report the number or rate of authentication attempts from multiple IP addresses within a given period of time or the rate at which authentication attempts are received from a given IP address.

In an implementation, the PEPs may relay to the PDP metrics or KPIs relating to the performance or QoS of network slice instances. In network slicing, the resources of a physical communication network are logically organized into multiple, virtualized networks, each of which provides a unique set of operating characteristics to meet the particular requirements (e.g., performance characteristics) of a given purpose. QoS-related KPIs include latency; throughput; reliability, relating to the network's ability to deliver data without errors (e.g., packet loss frequency or percentage); geographical area or coverage; area traffic capacity; connection density (e.g., devices per square kilometer); energy efficiency; Quality of Experience (QoE) relating to the user's subjective experience; service availability, such as the percentage of time the network is able to provide a required level of service; and handover success rate.

Other KPIs relating to network performance with respect to network slices can include, for example: the number of times user throttled from exceeding class of service bandwidth; peak data rates for uplinks or downlinks; and user experience data rates. The PEPs may also report other KPIs or metrics relating to network availability, accessibility, retainability, reliability, integrity, and/or mobility.

In still other implementations, the KPIs collected and reported by the PEPs to the PDP can include, for example: number of successful registrations to a network slice instance; number of subscribers registered to a network slice instance through as AMF; number of subscribers registered to a network slice instance through a UDM; gNB downlink latency; upstream or downstream throughput for network slice instance; upstream or downstream throughput at the interface between a radio access node and a UPF (i.e., the N3 interface); throughput between a radio access node and the user equipment; PDU sessions of a network slice instance; or utilization of a virtualized network resource (e.g., processors, memory, disk space, and so on) allocated to a network slice instance.

In response to the reported KPIs, the PDP may transmit new or updated actions to be taken by the PEPs relative to an access control policy, rule, or ruleset. Such actions can include, for example: allowing or denying a user or device access to a resource; allowing or denying third-party access to a resource; whitelisting or blacklisting a specific network IP address or range of IP addresses or endpoints; restricting full authentication; limiting access to particular network segments or zones; enforcing multi-factor authentication for particular request objects or targets; running specialized vulnerability scanning on BYOD (Bring Your Own Device) devices (that is, devices not assigned by an enterprise); isolating and deflecting suspicious requests from internal or external sources to a "honeypot" server; or, for a given user or device, setting a bandwidth threshold or maximum bandwidth according to a class of service beyond which network traffic is throttled.

KPI data, including derived, calculated, or aggregated KPIs, may be reported by the PEPs or by the PDPs as a number of events, an average, a percentage, or a rate or frequency at which a particular type of event occurs, which can be a number of occurrences over a specified period of time, such per second, per minute, per hour, per day, and so on. Aggregating KPIs can include deriving statistical quantities representative of KPI data sets such as averages (e.g., a weighted average, mean, median, mode), standard or average deviations, ranges, variations, outliers, frequencies, rates of change, margins of error, and so on. Aggregating KPIs can also include combining sets of KPI metrics reported by multiple PEPs for statistical analysis.

Turning now to the Figures, FIG. 1 illustrates operational environment 100 for operating a wireless communication network in an implementation. Operational environment 100 includes user equipment (UE) 110, access network 130 including radio access node 132 and PEP 131, carrier core 140 with PDP 142 and PEP 141, and other network(s) 152. Each of PEPs 131 and 141 and PDP 142 are representative of one or more PEPs or PDPs, respectively. The wireless communication network provides service to UE 110 according to network slice 101, 102, or 103 corresponding to the service requested by UE 110.

UE 110 is representative of smartphones, computers, sensors, controllers, and/or other user apparatus with processing circuitry for wireless communication, such as 5G-enabled smartphones and other computing devices. UE 110 is capable of communicating with radio access node (RAN) 132 over radio frequency bands.

RAN 132 is representative of equipment using radio frequencies to provide wireless connectivity to UE 110, such as Fifth Generation (5G) RANs, long-term evolution (LTE) RANs, geodes, eNodeBs, NB-IoT access nodes, LP-WAN base stations, wireless relays, Wifi hotspots, ENET access nodes, Bluetooth access nodes, and/or other wireless or wireline network transceivers. UE 110 and RAN 132 are also representative of wireless communication devices or radios which wirelessly communicate using protocols such as Fifth Generation New Radio (5GNR), 5G Advanced, LTE, Institute of Electrical and Electronic Engineers (IEEE) 902.11 (Wifi), Low-Power Wide Area Network (LP-WAN), Near-Field Communications (NFC), Code Division Multiple Access (CDMA), Frequency Division Multiple Access (FDMA), and Time Division Multiple Access (TDMA).

Figure 9:
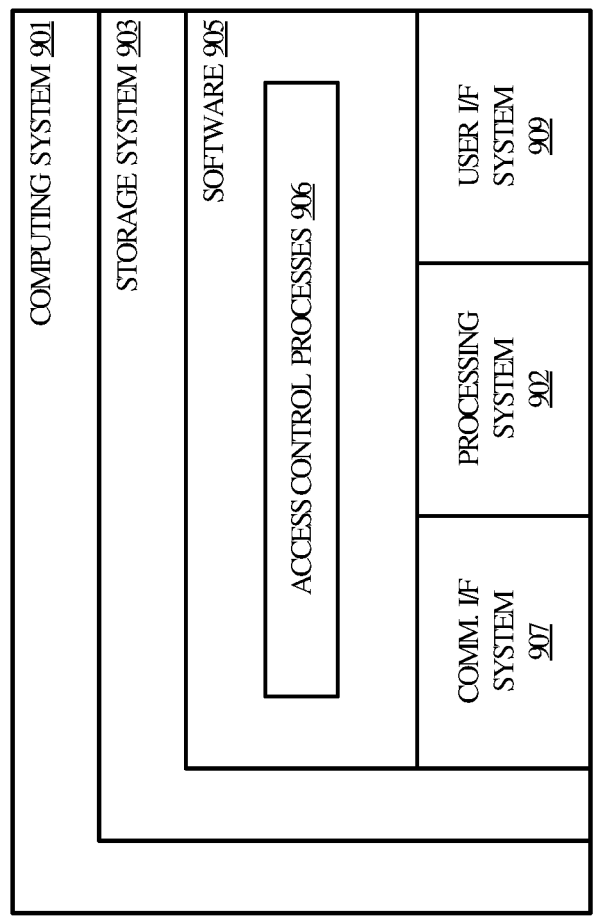
FIG. 9 illustrates a computing system suitable for implementing the various operational environments, architectures, processes, scenarios, and sequences discussed below with respect to the other Figures.

Access network 130 is representative of one or more edge, access, or aggregation networks of a distributed network architecture. Access network 130 is capable of communicating with RAN 132 as well as with carrier core 140. The wireless communication network including access network 130 and carrier core 140 is representative of a network operating a service-based architecture (SBA). An SBA architecture includes network functions and elements which constitute the control plane and user plane of a wireless communication network. Network elements of the SBA can include UDMs, AMFs, SMFs, PCFs, AUSFs, IWFs, and UPFs, as well as other network functions or virtual network functions. The network elements are implemented on one or more suitable computing devices, of which computing device 900 of FIG. 9 is representative. Examples of suitable computing devices include server computers, blade servers, and the like. The network elements of carrier care 140 may be implemented in the context of one or more data centers, in a co-located or distributed manner, or in some other arrangement.

Carrier core 140 is representative of a network capable of using a Fifth Generation New Radio (5GNR) protocol to communicate with UE 110 via RAN 132. In an implementation, carrier core 140 is representative of a service-based architecture (SBA) which includes network functions and elements which constitute the control plane and user plane of a wireless communication network core. Network elements of the SBA can include UDMs, AMFs, SMFs, PCFs, AUSFs, IWFs, and UPFs, as well as other network functions or virtual network functions. The network elements are implemented on one or more suitable computing devices, of which computing device 900 of FIG. 9 is representative. Examples of suitable computing devices include server computers, blade servers, and the like. The network elements of carrier core 140 may be implemented in the context of one or more data centers, in a co-located or distributed manner, or in some other arrangement.

Network slices 101, 102, and 103 are representative of instances of network resource allocations operating on the physical network infrastructure of the wireless communication network. Each slice has its own set of resources, such as bandwidth, processing power, and security, that are allocated and managed independently of the other slices. Each slice is optimized for a particular type of use, such as low-latency, high reliability service for industrial automation or high-bandwidth service for video streaming. Network slicing also accommodates the separation of service providers and infrastructure providers. The control plane of the network manages network slicing and network slice selection, that is, selecting the appropriate slice of network slices 101, 102, and 103 for UE 110 based on UE 110's requirements. Network PEPs produce KPIs particular to their respective slices. For example, PEPs 131 and 141 produce KPIs relating to performance and security for selected network slice 101.

Other network(s) 152 are representative of network data, devices, or services which UE 110 seeks to access via carrier core 140 and other elements of operational environment 100. Other network(s) 152 may include communication networks operated by entities different from the entity or entities operating carrier core 140. For example, a subscriber of other network(s) 152 may roam onto carrier core 140 and be provided communication services by carrier core 140 pursuant to a service-level agreement between the respective entities of other network(s) 152 and carrier core 140. Other network(s) 152 are also representative of endpoints of an end-to-end communication path originating from UE 110, including service provider services, Internet access, third-party services, or enterprise resources.

PEPs 131 and 141 are representative of points of access to the wireless communication network. (It may be appreciated that each of PEPs 131 and 141 represents one or more PEPs of a wireless communication network.) PEPs 131 and 141 may execute within an AMF, SMF, or UPF of carrier core 140 or access network 130 or may be distributed between multiple AMFs, SMFs and/or UPFs of carrier core 140 or access network 130. In an implementation, PEPs 131 and 141 are shared by entities such as MNOs, MVNOs, and/or enterprises and enforce security policies for security domains of those entities.

In operation, PEPs 131 and 141 receive requests for access to the network originating from UE 110 and send the requests to various PDPs (such as PDP 142) with which the PEPs are in communication for an access decisions. PEPs 131 and 141 receive policy decisions relating to various aspects of access, such as device registration, authentication, and authorization from the PDPs and act on those decisions accordingly. In some implementations, the PDPs provide access control policies or rules to the PEPs which act on the access requests accordingly.

In some implementations, PEPs 131 and 141 may be hosted by an MNO on behalf of an MVNO and/or an enterprise providing a resource. PEPs 131 and 141 may be front-end PEPs or intermediate PEPs, controlling access, for example, according to network slice or traffic granularity. For example, a PEP of PEPs 131 and 141 may be operated by the MNO and shared with the MVNO and the enterprise, or it may be jointly operated by the MNO and the enterprise (and/or the MVNO). Further, control of PEPs 131 and 141 may be allocated amongst the various entities at different OSI levels, at different levels of traffic granularity, or according to other access request parameters.

PDP 142 is representative of network policy servers which supply policy information to one or more PEPs of the network, of which PEPs 131 and 141 are representative. PDP 142 provides policies or policy decisions to the network PEPs for deciding an access request. In various implementations, PDP 142 may retrieve policies from a Policy Administration Point (PAP) which manages access policies and may retrieve information concerning request attributes from a Policy Information Point (PIP). Request attributes can include information relating to the subject or requestor (e.g., relating to attributes of UE 110), the object of the request (e.g., other network(s) 152), actions taken with respect to the object of the request, and/or environmental conditions on the network.

Referring still to FIG. 1, in operation, a device of UE 110 seeking to access a data network of other network(s) 152 submits an access request to each of the multiple PEPs, of which PEPs 131 and 141 are representative, which control access to the communication network including RAN 132, access network 130, and carrier core 140. Accessing the communication network includes registering the device with the communication network, authenticating or verifying the identity of the device, and authorizing access to the network services according to the device's subscription status and other applicable access policies. Once the device is authorized, the network and the device will exchange encryption keys to establish a secure connection. Each of the PEPs along the access request path implements access decisions according to access control policies or policy determinations provided by one or more PDPs, such as PDP 142.

In some implementations, the PDPs controlling one or more of PEPs 131 and 141 instruct the PEPs to provide KPIs relating to access attempts, such as the access request from the device of UE 110. The PDPs may configure or update access control policies based on trends detected by the PDPs in the KPIs. The PDPs may also configure and report aggregate KPIs to higher-level PDPs in a PDP hierarchy of the network. The higher-level PDPs may configure new or updated access control policies and push the new or updated policies down to the lower-level PDPs and PEPs. The higher-level PDPs may also instruct the PDPs and PEPs to provide specific types of KPIs for analysis of network performance, network slice performance, QoS, network security, or network Quality of Trust.

Figure 2:
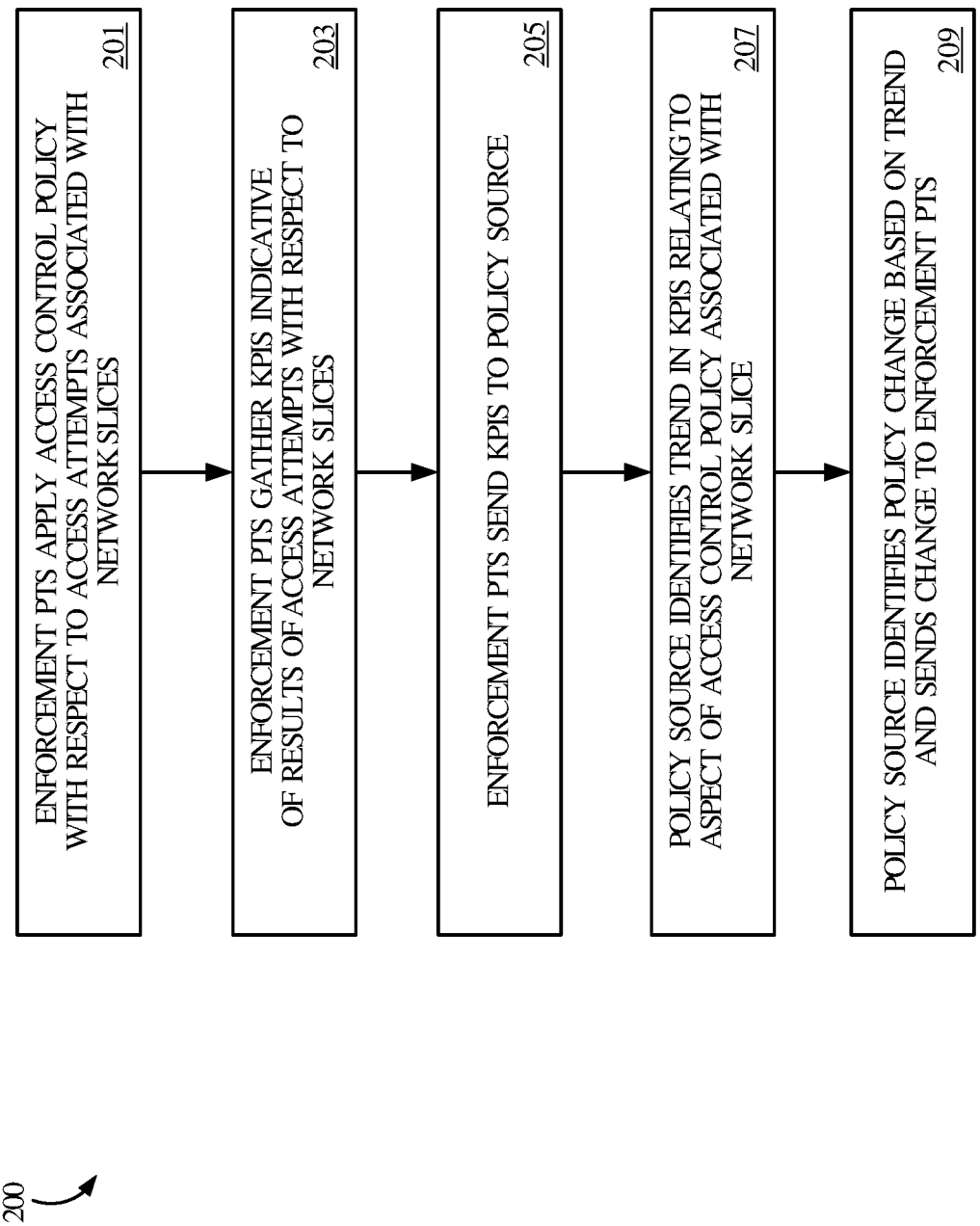
FIG. 2 illustrates an exemplary operation of a wireless communication network in an implementation.

FIG. 2 illustrates process 200 performed by a policy source and enforcement points of a wireless communication network, such as PEP 141 and PDP 142 of FIG. 1, to safeguard access to the network resources of a wireless communication network. The process executes on one or more computing devices of carrier core 140 according to program instructions which direct the computing devices to function as follows, referring parenthetically to the steps in FIG. 2 and in the singular for the sake of clarity.

In an implementation, the enforcement points of the wireless network receive an access control policy from a controlling policy source. The enforcement points apply the access control policy with respect to access attempts originating from user devices and associated with network slices (step 201). The access control policy includes attributes which are matched by the enforcement point (or policy source supplying the policy) to determine whether the policy applies to each of the access attempts originating from the user devices. The enforcement point implements decisions with respect to the access attempts—that is, allows or denies access to the network segment or resource safeguarded by the enforcement point—according to the access control policy. For example, the access control policy may authenticate the identity of the requestor by a SSO (Single Sign-On) or LDAP (Lightweight Directory Access Protocol) authentication system. For another example, the access control policy may specify the maximum allowable bandwidth according to the class of service of the request. In some implementations, a parameter of the request may be compared to a threshold value or range of values, such as a schedule of days or times during which access is allowed or denied. In some implementations, the access control policy may require the enforcement point to collect data relating to the access attempts, such as successful authentications or IP addresses of suspicious activity (e.g., of multiple failed authentication attempts).

As the enforcement point applies the access control policy to access attempts, the enforcement points gather KPIs which are indicative of the results of the access attempts with respect to the network slices (step 203). The KPIs may relate to network trust or security aspects or network performance aspects of the access control policy. For example, the enforcement point may collect data relating to the number of successful or failed attempts over a given period of time with respect to the IP address of the requestor or with respect to the endpoint of the request (e.g., type of access requested—view, edit, delete, read, write, etc.). The enforcement point may also collect data regarding the types of authentication used or amount of time to authenticate a request. The enforcement point may also collect network performance data, e.g., throughput or bandwidth consumption for a period of time, data rates (e.g., uplink or downlink rates), or latency for the network segment safeguarded by the enforcement point.

The KPIs collected by the enforcement points of the communication network may be reported as cumulative (integer) counts, as percentages, or as rates or frequencies over a given period of time. The KPIs may be derived or calculated based on an algorithm provided by a policy source or PDP. For example, the KPI may be an average or a weighted average of data from the results of the access attempts collected over a specified period of time.

The enforcement points send the KPIs to a policy source in the wireless network (step 205). The enforcement points may configure the KPIs into a data object for transmission to the policy source. The KPI data object may include a vector, table, or array of data values which reflect the results of the access attempts. In configuring the KPIs for transmission, the KPI data object may be encoded or encrypted for secure transmission to the PDPs.

The policy source of the wireless communication network receives KPIs transmitted by one or more enforcement points and identifies a trend in the KPIs relating to an aspect of the access control policy associated with a network slice (step 207). The trend may relate to an access-related activity (e.g., relating to device registration, authentication, authorization, exchanging security keys, and so on) which may be categorized as atypical or excessive with respect to one or more threshold values of the applicable network slice. The trend may be identified in terms of one or more common elements among the attributes of the KPI datasets received from multiple enforcement points, such as a common element among an aggregate set of failed authentication attempts. For example, the policy source may identify a high number of failed authentication attempts from a range of IP addresses over a given period of time such that the frequency of the authentication attempts exceeds some threshold value. The trend may also take the form of increase or decrease in a parameter of the access attempts.

Having identified a trend in the KPIs relating to an aspect of the access control policy, the policy source identifies or determines a change to the access control policy based on the identified trend (step 209). The change may be a new policy or rule, or an update to one or more attributes of an existing policy or rule. The change may also include a new or updated threshold value which triggers an action or stops an action by an enforcement point. For example, an authentication-related policy may deny access to a range of IP addresses according to a high-frequency trend in failed authentication attempts. For another example, the change may redefine the request parameters under which a multi-factor authentication (MFA) is required. A change to an access control policy may also include specifying a new or updated KPI to be collected or calculated by the enforcement points for submission to the policy source. Having identified the change to the access control policy based on the trend in the KPI data, the policy source sends the change to the enforcement points. The enforcement points then implement the change with respect to new authorization attempts.

Referring again to FIG. 1, the wireless communication system of operational environment 100 illustrates a brief example of process 200 as employed by elements of operational environment 100. In operation, a user computing device UE 110 requests access to a resource, such as other network(s) 152, via network slice 101 on the wireless communication network of carrier core 140. The request is received by RAN 132 and transmitted to access network 130 and then to carrier core 140.

At RAN 132, the request for access from the device of UE 110 is received by PEP 131. PEP 131 receives and applies one or more access control policies to determine whether access should be allowed. PEP 131 receives the access control policies from a PDP such as PDP 142 or a PDP (not shown) of access network 130. PEP 131 compares attributes of the request to an access control policy. The parameters of the request may be drawn from header information in the message, such as an XML message, containing the request. For example, in applying the access control policy, PEP 131 may determine that username and password attributes of the request are not a valid or verifiable identity, and authentication fails. As a result, PEP 131 denies the request and stores KPI data relating to the request (e.g., request attributes, context of the request, results, and so on) for further analysis by PEP 131 or by the PDP(s) receiving the KPI data.

PEP 131 continues to receive access attempts from other user devices. Periodically, PEP 131 transmits the KPI data relating to the access attempts received at PEP 131 to a PDP of access network 130. The PDP receives the KPI data and identifies a trend in the KPI data. The trend is indicative of a change or trend in one or more request attributes which may indicate a broader trend potentially impacting network performance or security. The PDP then identifies a change to an aspect of the applicable or relevant access control policy associated with network slice 101 based on the trend. Continuing the exemplary scenario described above, a high frequency of failed authentication attempts within a short period of time (say, an hour) may trigger the addition of multi-factor authentication to strengthen the network against a potential malicious attack. Alternatively, the PDP may detect a common factor to the failed authentication attempts, such as a common username or range of IP addresses, which cause the PDP to configure a rule denying access to that username or range of IP addresses. In still other implementations, the PDP may detect that the access attempts are failing due to the sheer volume of attempts made in a short period of time at PEP 131, and based on that trend, the PDP may direct RAN 132 to divert a subset of the requests, such as requests relating to network slice 102, to an alternate PEP or alternate access network for handling. Having identified a policy change based on the identified trend, the PDP pushes the policy change to the PEPs within its control. The PEPs, including PEP 131, implement the change with respect to incoming access attempts.

A technical effect of the technology disclosed herein is to manage access control policies in distributed manner, such as within a distributed PDP architecture, including dynamically responding to trends detected in network traffic flow through PEPs by modifying access control policies to in response to the trends. Further, modifications to access control policies can be determined and applied according to the scope of the trend. For example, the PDP in the above exemplary scenario may report aggregated KPIs based on the KPIs received from the PEPs to a higher-level PDP. The higher-level PDP may detect a trend based on aggregated KPIs received from multiple lower-level PDPs and configure a policy change based on the detected trend. Thus, the technology presents an adaptive or feedback system for responding to a trend in access attempts by modifying access control policies and policy sets according to the scope of the trend, i.e., according to whether the trend is localized or more widespread. The ability of PDPs to respond to trends in the KPI data allows the network to localize management of network traffic at or near the edge of the network, which in turn allows for better network optimization, faster detection of security or performance issues, and improved response times for actions based on the KPI data.

The technology disclosed herein further enables Quality of Trust (QoT) to be measured or quantified for a wireless network or for a subset of the network, generally or according to a network slice. A network QoT may be configured or determined based on the KPIs received from a network PDP architecture to provide an overall or slice-based assessment of network security or trust health. A QoT can include a collection of KPIs or heuristics which reflect network security or trust health based on an aggregation of security- or trust-related KPIs collected by the network PEPs.

A general or slice-based network QoT may be defined according to a scope of applicability within the network. For example, a "local QoT" can be determined at a local level for a particular geographic or coverage area of the network based on KPI data from PEPs of the area; at a higher level, such as for a particular geographic or coverage region based on KPI data from a broader set of PEPs; for a particular core or edge network; or even more broadly, such as a "global QoT" reflecting network trust health across the entire network based on KPI data collected or aggregated from PEPs across the network. QoTs may also be defined for particular classes of network functions across the network, e.g., for all network UDMs or for all network AMFs.

In an implementation, for each of the respective network slices or for the network generally, network PDPs monitor KPIs of network traffic flowing through PEPs, process the KPIs to measure and calculate a QoT, and identify modifications to policies based on trends identified in the KPIs. The PDPs may modify formulas for computing QoT values based on KPIs gathered by the PEPs. The PDPs may also modify instructions to the PEPs regarding the type of information, i.e., KPI data, that the PEP is to provide to the PDP.

In an implementation, PDPs of a wireless network import information from a QoT repository which holds general or slice-specific QoT parameters, values, KPIs, thresholds, formulas, and actions. The PDPs then instruct PEPs on how specific QoT parameters are to be measured and the formulas to compute an overall QoT value. The PDPs also instruct the PEPs on thresholds for the QoT values and the packet or flow action that a PEP is to perform when a threshold is breached for a given network slice.

Figure 3:
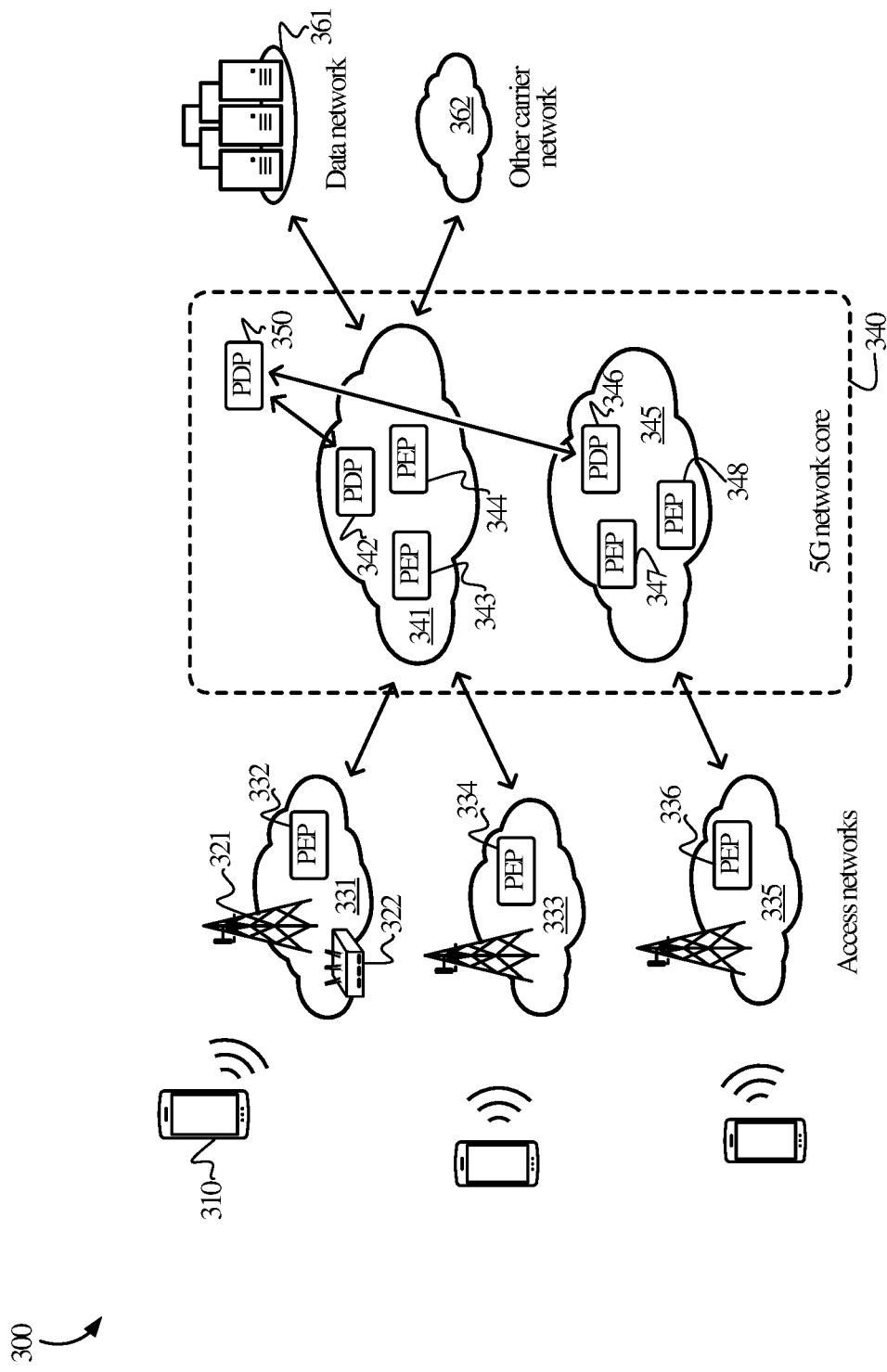
FIG. 3 illustrates an operational environment of a wireless communication network in an implementation.

Turning now to FIG. 3, operational environment 300 illustrates operation of a 5G network in an implementation. FIG. 3 includes UE 310 connecting to 5G network core 340 via RAN 321 of access network 331. Access network 331 also includes Wifi access node 322 by which UE 310 can connect to the wireless communication network via a LAN, WAN, or other non-cellular access network, for example.

The various PEPs and PDPs of the wireless communication network form the policy architecture of the network. Access networks 331, 333, and 335 include PEPs 332, 334, and 336, respectively. 5G network core 340 includes 5G regional networks 341 and 345. 5G regional network 341 includes PDP 342 which provides authorization policies to PEPs 343 and 344, while 5G regional network 345 includes PDP 346 providing policies to PEPs 347 and 348. PDP 342 and PDP 346 communicate with higher-level PDP 350 of 5G network core 340. Data network 361 is representative of Internet access or other data network which includes the object of an access request from UE 310. Alternatively, other carrier network 362 is representative of a wireless communication network which allows UE 310 to communicate with a subscriber of other carrier network 362.

In an example of network operation, UE 310 requests access to the 5G network to connect with data network 361. To access to the 5G network, UE 310 registers with the network by sending its unique identity, such as an IMEI or IMSI number, to the network. Once UE 310 is registered, the network authenticates UE 310's identity, for example, by checking UE 310's identity against a database of authorized users or by an LDAP or SSO authentication method. The network also allocates a network slice instance to UE 310 according to the access requested.

When UE 310's identity is authenticated, the network PEPs of the communication path from UE 310 to data network 361, of which PEPs 332, 343, and 344 are representative, consult access control policies including slice-specific access control policies of the network to determine if access is authorized and what services are to be provided to UE 310. The access control policies include policies relating to the device's subscription status, device type (such as smartphones but not IoT devices) and location, services provided (such as voice services but not data services), QoS policies (such as maximum bandwidth or latency), security policies (e.g., level of security a device must have before it is allowed to connect) and time-based policies (e.g., scheduled access to the network during certain times of the day).

In determining access for UE 310 according to the access control policies, the various PEPs of the policy architecture gather, compute, and configure KPI data for transmission to network PDPs, of which PDPs 342 and 350 are representative, from which PEPs 332, 343, and 344 receive the policies. The KPI data are indicative of results of the access requests with respect to network slices. Upon receiving the KPI data from the network PEPs, a PDP identifies a trend in the KPI data, such as a pattern in the KPI data suggesting anomalous behavior with respect to a performance or security aspect of an access control policy. The trend may take the form of one or more KPI values exceeding a threshold value or falling outside a range of nominal or acceptable values, where the threshold or range may be selected or determined according to the applicable network slice.

Upon identifying the trend, the PDP identifies a change to the access control policy based on the trend. For example, the change may respond to the trend by adjusting an aspect of a network performance policy to accommodate the detected behavior or by imposing control measures which increase the security of the network to thwart malicious actors. The PDP then pushes the policy change to the PEPs under its control or to the PEPs which are exposed to the anomalous behavior.

In an implementation, the PDP may send to a higher-level PDP, of which PDP 350 is representative, higher-level or aggregate KPI data based on the KPI data received from the PEPs. Higher-level or aggregate KPI data is derived from multiple sets of KPI data, such as sets of KPI data received from multiple PEPs, or sets of KPI data received from a single PEP at different periods of time. To generate a set of higher-level or aggregate KPI data, the PDP may produce descriptive statistical quantities of various KPIs, such as an average of KPI values, a range or spread of KPI values, or a rate of change of a KPI. KPIs may be aggregated according to network slice.

In some implementations, the PDP or higher-level PDP may define a new or updated KPI algorithm for a KPI to be calculated and transmitted by the PEPs and/or PDPs. The KPI algorithm is then pushed to the lower-level PEPs and PDPs to be implemented by the PEPs for subsequent access attempts. For example, the PDP may instruct the PEPs to collect KPI data relating to latency for low-latency network slice instances where the requestor is an industrial automation device.

Figure 4:
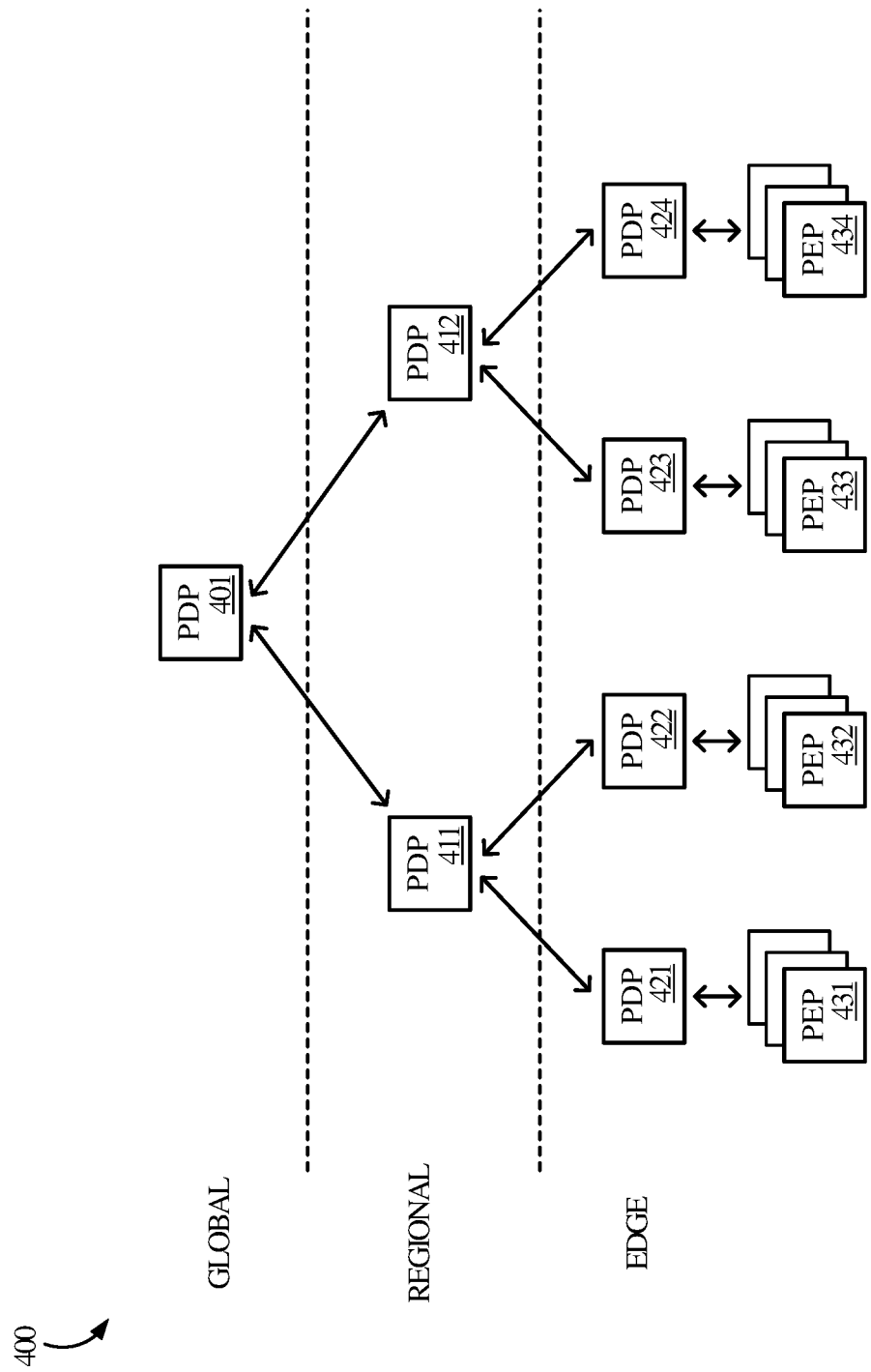
FIG. 4 illustrates an operational architecture of a wireless communication network in an implementation.

FIG. 4 illustrates policy architecture 400 for a wireless communication network in an implementation. Policy architecture 400 illustrates a PDP hierarchy of three layers, although it may be appreciated that any number of layers is within the scope of the technology disclosed herein. At the lowest level are edge PDPs 421-424 which are representative of PDPs communicating with PEPs 431-434, each of which are representative of one or more PEPs located near the edge of the wireless communication network. Edge PDPs 421-424 include PDPs executing within the multi-access edge compute (MEC) layer of the wireless communication network.

Edge PDPs 421 and 422 report to regional PDP 411, while edge PDPs 423 and 424 report to regional PDP 412. Regional PDP 411 receives KPI data, such as aggregate or higher-level KPI data, from edge PDPs 421 and 422 based on the KPI data that edge PDPs 421 and 422 receive from PEPs 431 and 432, respectively. KPI data reported to regional PDPs 411 and 412 are indicative of results of network access attempts made by user equipment according to the network slices indicated by the attempts.

Global PDP 401 is representative of a higher-level PDP which receives KPI data from regional PDPs 411 and 412 based on the KPI data received by those PDPs. The KPI data received by global PDP 401 may include KPI data received by regional PDP 411 and 412, but can also include KPI data derived or aggregated data by edge PDPs 421-424. Here, too, the KPI data may be aggregated according to network slice data as well as according to other access attempt parameters or attributes.

In policy architecture 400, a higher-level PDP may identify a trend in the KPI data received from lower-level PDPs. Having identified a trend in the KPI data, the higher-level PDP will identify a change to an aspect of the access control policy relating to the KPI data, then push the policy change down to the lower-level PDPs and, ultimately, to the PEPs. In some implementations, a higher-level PDP may push a policy change down to selected lower-level PDPs and PEPs based on the trend. For example, where a trend is localized to, say, PEPs 432, regional PDP 411 may push a policy change to edge PDP 422. Edge PDP 422 then pushes the policy change to PEPs 432 to carry out the changed policy. On the other hand, if regional PDP 412 detects a broader or, say, regional trend in KPI data reported by PEPs 433 and 434, regional PDP 412 may configure a policy change responsive to the trend and push the change down to edge PDPs 423 and 424 and PEPs 433 and 434.

In various implementations, PDPs at different levels of a network may be owned by different entities. As such, lower-level PDPs may first subscribe to and be authorized by higher-level PDPs to enable communication and data transfer between the PDPs. When a lower-level PDP, such as edge PDP 422, is authorized and validly subscribed to a higher-level PDP, such as regional PDP 411, the lower-level PDP can transmit accumulated KPI data to the higher-level PDP. If no authorization is in place, then the higher-level PDP will not accept the KPI data from the lower-level PDP. Further, a policy change may also require authorization by the lower-level PDP to be accepted by that PDP. In scenarios where the lower-level PDPs or PEPs and higher-level PDPs belong to the same entity, authorization may not be required between the network functions.

Figure 5:
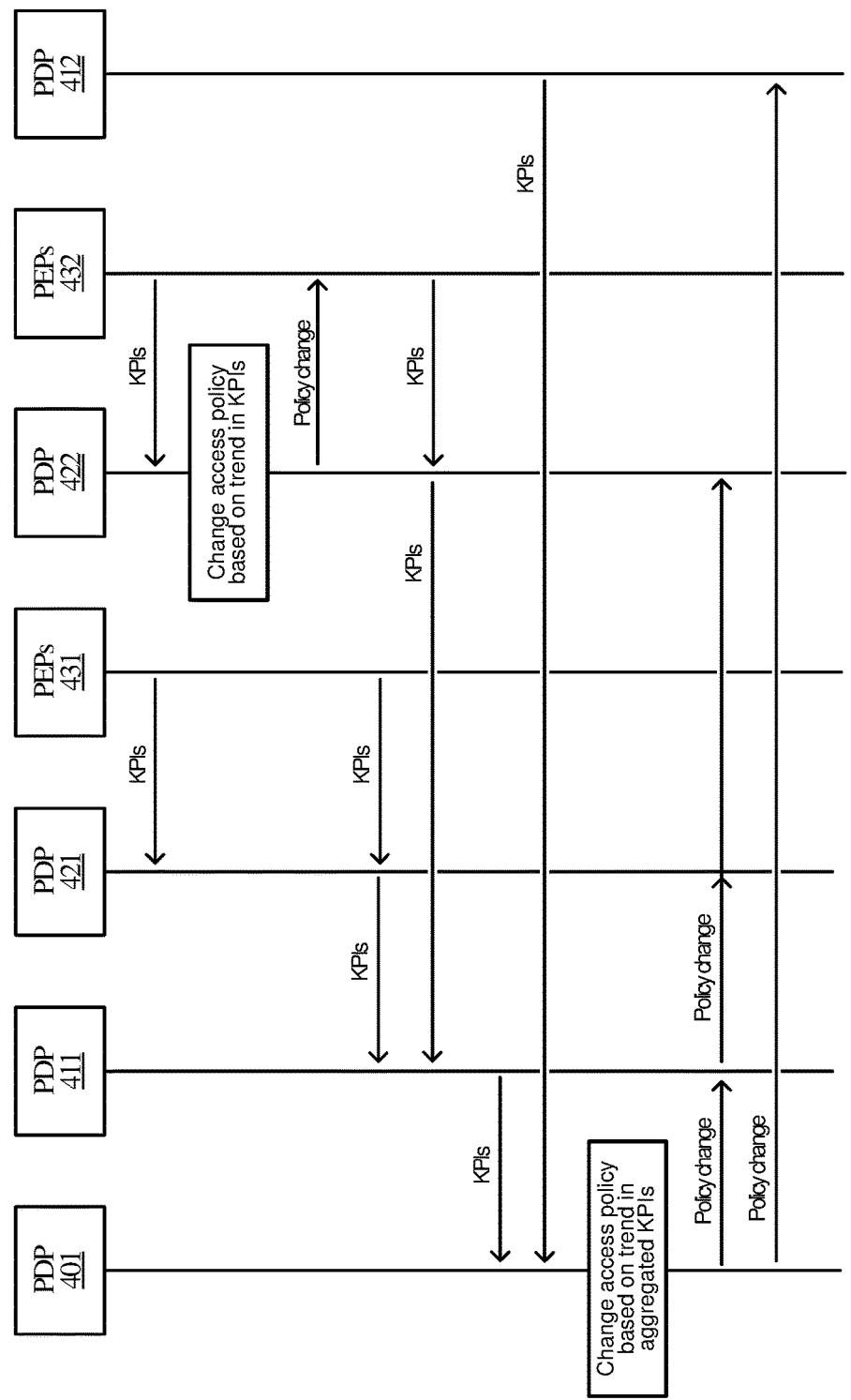
FIG. 5 illustrates an operational scenario of a wireless communication network in an implementation.

FIG. 5 illustrates operational scenario 500 of a wireless communication network representative of various processes, such as process 200, associated with the technology disclosed herein in an implementation. Operational scenario 500 refers to the elements of policy architecture 400 of FIG. 4.

In operational scenario 500, PEPs 431 and 432 send to edge PDPs 421 and 422, respectively, KPIs relating to access control policies associated with network slices. In an exemplary scenario, PEPs 431 and 432 generate or collect the KPIs with respect to access attempts made at those PEPs. The KPIs may relate to network security or Quality of Trust, network performance or QoS, and the like. Edge PDP 422 identifies a trend in the PEP KPIs received from PEPs 432, such as a sudden uptick in bandwidth consumption or an unusually high number of failed authentication attempts (exceeding some threshold value) for a particular slice. Having identified a trend in the KPI data, edge PDP 422 identifies a change to the authorization policy based on the trend. Edge PDP 422 may consult a policy framework connected to edge PDP 422, such as a policy repository, policy engine, or PAP, to identify or determine the policy change. Edge PDP 422 sends the change to PEPs 432 to implement with regard to new access attempts.

Continuing with FIG. 5, in another exemplary scenario, PEPs 431 and 432 send to edge PDPs 421 and 422, respectively, KPIs relating to access control policies associated with network slices. PEPs 431 and 432 generate or collect the KPIs with respect to access attempts made at those PEPs. The KPIs may relate to network security or Quality of Trust, network performance or QoS, and the like. Edge PDPs 421 and 422 configure and send KPIs to regional PDP 411. The KPIs sent to regional PDP 411 from edge PDPs 421 and 422 can include the KPIs received from PEPs 431 and 432 but may also include KPIs derived from the PEP KPI data, such as averages of a KPI metric, a range of KPI metric, a minimum or maximum value of a KPI metric, and so on.

Next, global PDP 401 receives aggregated KPIs from regional PDPs 411 and 412. The aggregated KPIs received by global PDP 401 are based on the KPIs reported by PEPs 431-434 to edge PDPs 421-424, respectively. As KPI data moves up through the PDP hierarchy of policy architecture 400, the receiving PDPs calculate new KPI quantities based on the KPI data received from the lower-level elements. For example, edge PDP 421 may compute an average of a KPI metric based on the KPI data received from PEPs 431. Regional PDP 411 may compute an average of the averages computed by edge PDPs 421 and 422, or regional PDP 411 may compute an average of the KPI data as it was reported by PEPs 431 and 432. The average computed by regional PDP 411 would be representative of or describe the KPI metric over a larger sector of the wireless communication network or over a larger geographical or coverage area of the network as compared to, say, averages computed by edge PDPs 421 and 422. The pattern continues with global PDP 401—an average of the KPI metric computed by global PDP 401 will describe the behavior of the KPI metric over an even broader sector or coverage area of the network.

Global PDP 401 may identify a trend over the KPI data received from regional PDPs 411 and 412 and determine a policy change which it transmits to regional PDPs 411 and 412. Regional PDPs 411 and 412 disseminate the policy change down through the rest of policy architecture 400. In an implementation, global PDP 401 computes a QoT metric for the network or for a subset of the network based on the KPI data received from the lower-level PDPs and/or PEPs.

Figure 6:
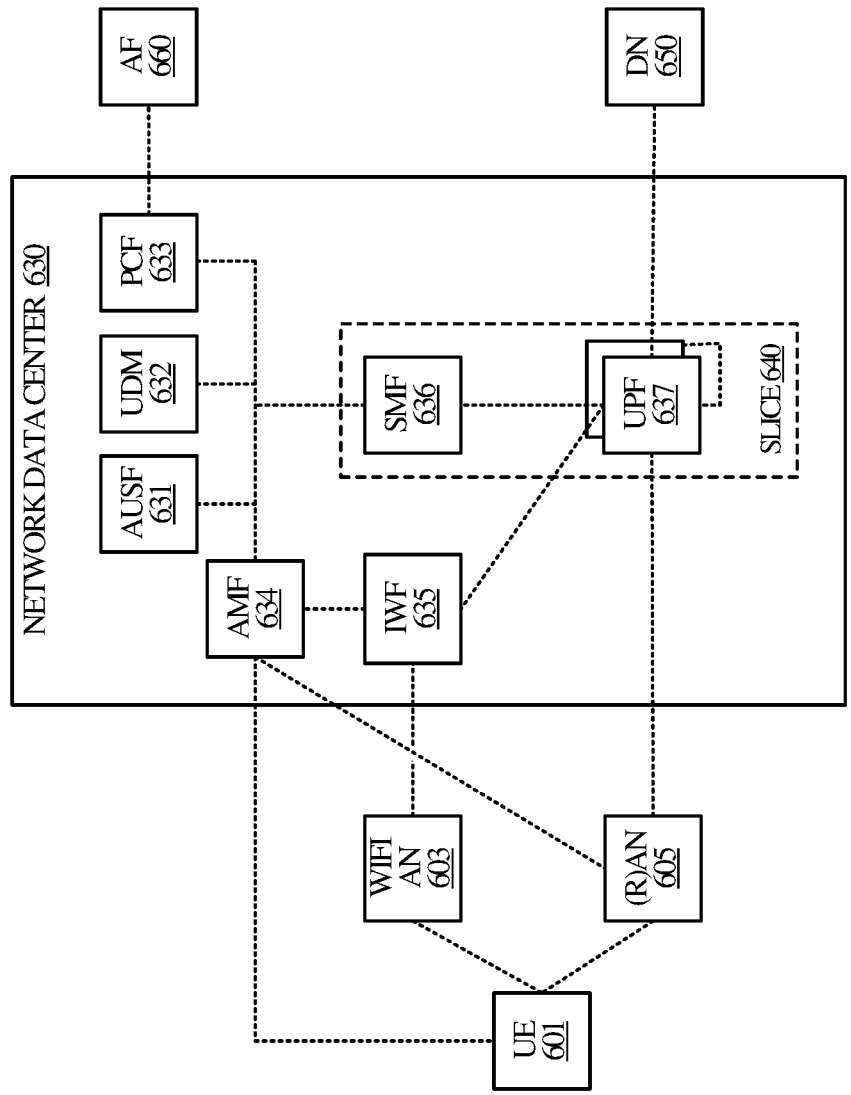
FIG. 6 illustrates an operational architecture for a wireless communication network in an implementation.

FIG. 6 illustrates exemplary wireless communication system 600 that serves wireless User Equipment (UE) 601 based on policies. Wireless communication system 600 comprises UE 601, Wifi Access Node (AN) 603, 5GNR AN 605, Interworking Function (IWF) 635, Access and Mobility Management Function (AMF) 634, Authentication Server Function (AUSF) 631, Unified Data Management (UDM) 632, Policy Control Function (PCF) 633, Session Management Function (SMF) 636, User Plane Function (UPF) 637, and Application Function (AF) 660. AF 660 may provide policies applicable to control plane functions, that is, to the application, presentation, and/or session layers of the OSI protocol stack. IWF 635 includes non-3GPP IWFs (N3IWFs) for providing untrusted non-3GPP access to network data center 630, such as access via a non-cellular access network. Wireless network slice 640 includes UPF 637 and SMF 636. DN 650 is representative of a data network, Internet access, third-party resource, or other endpoint of an end-to-end communication path from UE 601. AUSF 631, UDM 632, and PCF 633 are examples of PDPs, such as PDP 142 of FIG. 1, although PDP 142 may differ. AMF 634 and SMF 636 are examples of PEP 141 of FIG. 1, although PEP 141 may differ.

In an implementation, UE 601 communicates with network data center 630 via Wifi access node 603 or 5GNR access node 605. UE 601 requests access to DN 650 via the communication network of network data center 630. SMF 636 receives the access request from AMF 634 and other network functions of the communication network which are enforcing various aspects of the access request from UE 601. SMF 636 receives policies or policy decisions from AUSF 631, UDM 632, PCF 633, and/or AMF 634.

Figure 7:
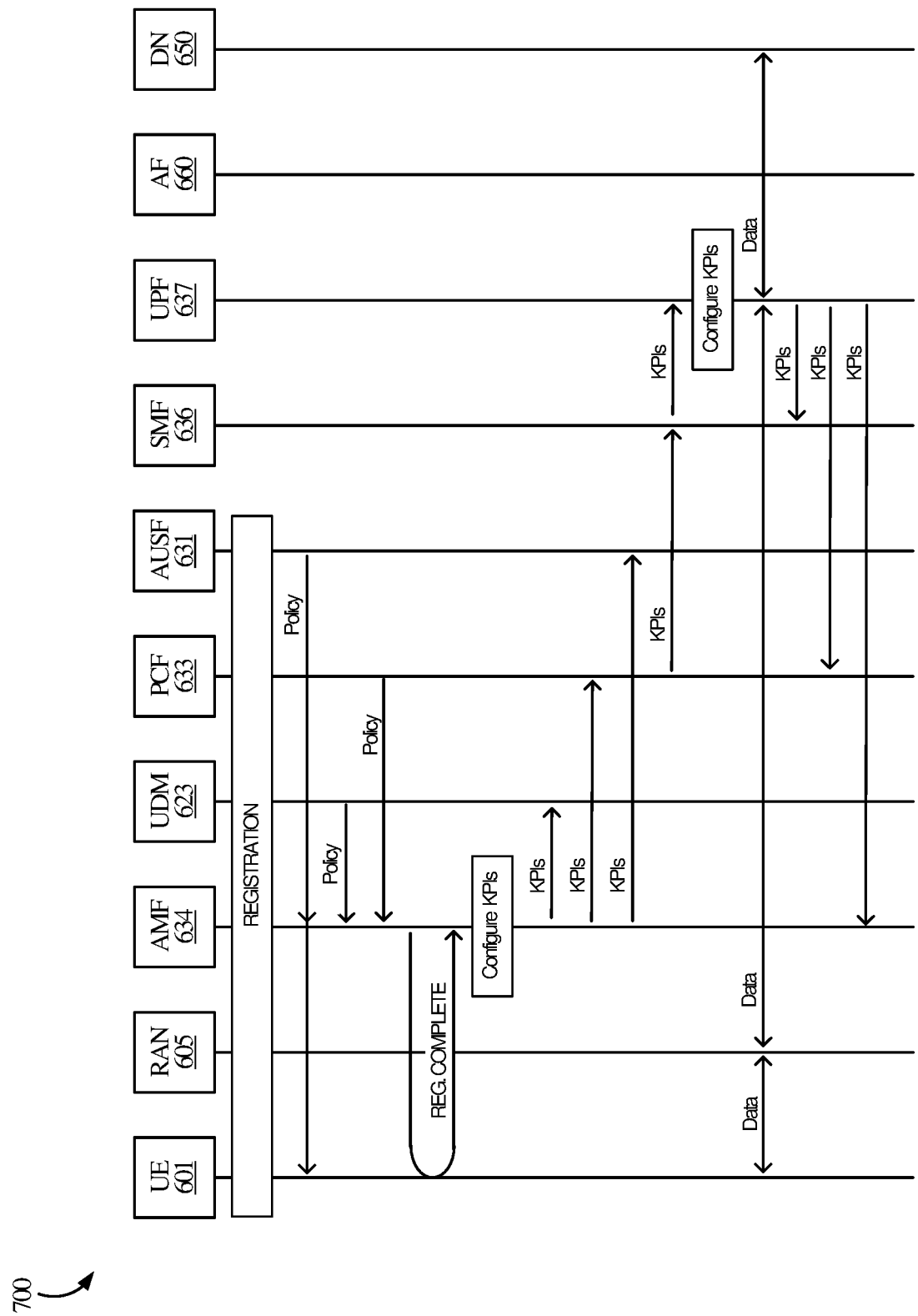
FIG. 7 illustrates an operational scenario of a wireless communication network in an implementation.

FIG. 7 illustrates operational scenario 700 of a wireless communication network in a simplified implementation. Operational scenario 700 refers to the elements of wireless communication system 600 of FIG. 6.

In FIG. 7, UE 601 registers with the wireless communication network of network data center 630. To register with the network, UE 601 searches for available 5G networks and selects the desired network to connect to. During registration, AMF 634 receives policies from AUSF 631, UDM 623, and PCF 633. UE 601 is authenticated by AMF 634 using authentication policies from AUSF 631 and UE 601's security credentials, such as an IMEI number to confirm its identity. UE 601 is then authorized by AMF 634 according to policies provided by UDM 623 to access network resources based on the user's or subscriber's profile and network policies. PCF 633 provides AMF 634 with access and mobility policies (e.g., roaming policies) and policies relating to network slicing. UE 601 is then provided a network address, such as an IP address, and configured by SMF 636 to access the appropriate network services and resources.

AMF 634 generates or collects KPI data relating to the policies received from AUSF 631, UDM 623, and PCF 633 as access attempts are made by various ones of UE 601 and periodically transmits the KPI data to the respective network functions. The network functions may identify trends in the access attempts and configure policy changes to address the trends. The policy changes are pushed to AMF 634 to be implemented with respect to new access attempts.

Once device registration is complete, user data flows within the data plane between UE 601, RAN 605, UPF 637, and DN 650. UPF 637 configures KPI datasets relating to the flow of data traffic through UPF 637 for policy sources SMF 636, PCF 633, and AMF 634. UPF 637 periodically transmits the KPI data to various ones of SMF 636, PCF 633, and AMF 634 for analysis. For example, PCF 633 may detect a trend in the KPI data and request from UPF 637 a more granular form of KPI data be reported for new access attempts. AMF 634 may relay the KPI data or an aggregate or representation of the KPI data (e.g., descriptive statistical quantities) to higher level policy providers such as AUSF 631, UDM 623, or PCF 633 for analysis and possible response.

Figure 8:
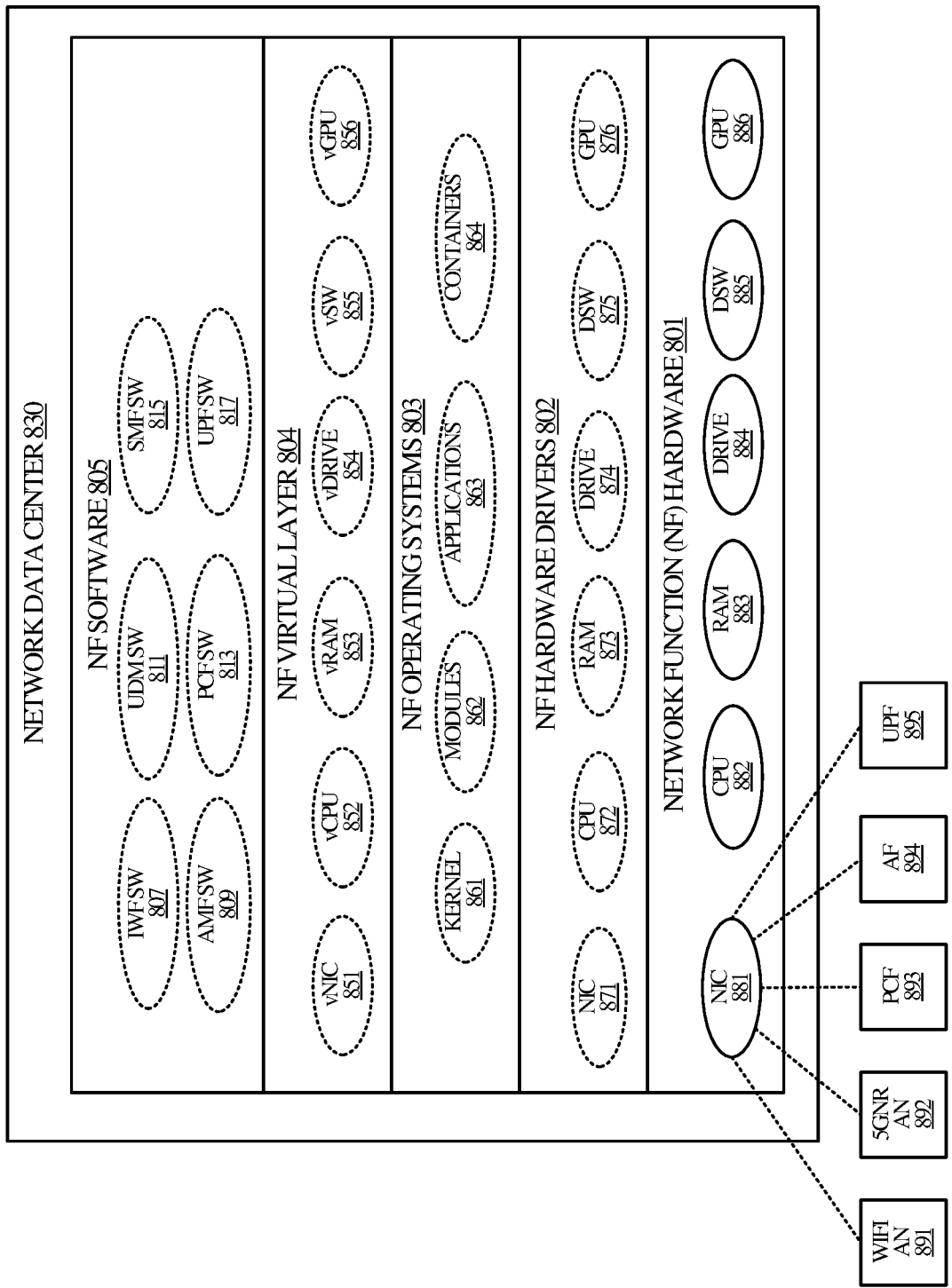
FIG. 8 illustrates a network data center architecture of a wireless communication network in an implementation.

FIG. 8 illustrates exemplary network data center 830, a network core of a wireless communication system, of which carrier network 140 and access network 130 of FIG. 1 are representative. Network data center 830 includes network function (NF) software 805, network function virtual layer 804, network function operating systems 803, network function hardware drivers 802, and network function hardware 801.

Network function software 805 of network data center 830 includes software for executing various network functions: IWF software 807, AMF software 809, UDM software 811, PCF software 813, SMF software 815, and UPF software 817. Other network function software, such as network repository function (NRF) software, are typically present but are omitted for clarity.

Network function virtual layer 804 includes virtualized components of network data center 830, such as virtual NIC 851, virtual CPU 852, virtual RAM 853, virtual drive 854, virtual software 855, and virtual GPU 856. Network operating systems 803 includes components for operating network data center 830, including kernels 861, modules 862, applications 863, and containers 864 for network function software execution. Network function hardware drivers 802 include software for operating network function hardware 801 of network data center 830, including network interface card (NIC) drivers 871 for NICs 881, CPU drivers 872 for CPUs 882, RAM drivers 873 for RAM 883, flash/disk drive drivers 874 for flash/disk drives 884, data switch (DSW) drivers 875 for data switches 885, and drivers 876 for GPUs 886. Of network function hardware 801 of network data center 830, network interface cards 881 include hardware components for communicating with Wifi access node 891, 5GNR access node 892, PCF 893, application server 894, and UPF 895.

Turning now to FIG. 9, architecture 900 illustrates computing device 901 that is representative of any system or collection of systems in which the various processes, programs, services, and scenarios disclosed herein may be implemented. Examples of computing device 901 include, but are not limited to, server computers, web servers, cloud computing platforms, and data center equipment, as well as any other type of physical or virtual server machine, container, and any variation or combination thereof. Examples also include desktop and laptop computers, tablet computers, mobile computers, and wearable devices.

Computing device 901 may be implemented as a single apparatus, system, or device or may be implemented in a distributed manner as multiple apparatuses, systems, or devices. Computing device 901 includes, but is not limited to, processing system 902, storage system 903, software 905, communication interface system 907, and user interface system 909 (optional). Processing system 902 is operatively coupled with storage system 903, communication interface system 907, and user interface system 909.

Processing system 902 loads and executes software 905 from storage system 903. Software 905 includes and implements access control processes 906, which is representative of the access control processes discussed with respect to the preceding Figures, such as process 200. When executed by processing system 902, software 905 directs processing system 902 to operate as described herein for at least the various processes, operational scenarios, and sequences discussed in the foregoing implementations. Computing device 901 may optionally include additional devices, features, or function not discussed for purposes of brevity.

Referring still to FIG. 9, processing system 902 may comprise a micro-processor and other circuitry that retrieves and executes software 905 from storage system 903. Processing system 902 may be implemented within a single processing device but may also be distributed across multiple processing devices or sub-systems that cooperate in executing program instructions. Examples of processing system 902 include general purpose central processing units, graphical processing units, application specific processors, and logic devices, as well as any other type of processing device, combinations, or variations thereof.

Storage system 903 may comprise any computer readable storage media readable by processing system 902 and capable of storing software 905. Storage system 903 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 903 may also include computer readable communication media over which at least some of software 905 may be communicated internally or externally. Storage system 903 may be implemented as a single storage device but may also be implemented across multiple storage devices or sub-systems co-located or distributed relative to each other. Storage system 903 may comprise additional elements, such as a controller, capable of communicating with processing system 902 or possibly other systems.

Software 905 (including access control processes 906) may be implemented in program instructions and among other functions may, when executed by processing system 902, direct processing system 902 to operate as described with respect to the various operational scenarios, sequences, and processes illustrated herein. For example, software 905 may include program instructions for implementing the access control processes as described herein.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 905 may include additional processes, programs, or components, such as operating system software, virtualization software, or other application software. Software 905 may also comprise firmware or some other form of machine-readable processing instructions executable by processing system 902.

In general, software 905 may, when loaded into processing system 902 and executed, transform a suitable apparatus, system, or device (of which computing device 901 is representative) overall from a general-purpose computing system into a special-purpose computing system customized to perform access control processes. Indeed, encoding software 905 on storage system 903 may transform the physical structure of storage system 903. The specific transformation of the physical structure may depend on various factors in different implementations of this description. Examples of such factors may include, but are not limited to, the technology used to implement the storage media of storage system 903 and whether the computer-storage media are characterized as primary or secondary, etc.

For example, if the computer readable storage media are implemented as semiconductor-based memory, software 905 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 907 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

Communication between computing device 901 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses and backplanes, or any other type of network, combination of network, or variation thereof. The aforementioned communication networks and protocols are well known and need not be discussed at length here.

As will be appreciated by one skilled in the art, aspects of the present invention may be embodied as a system, method, or computer program product. Accordingly, aspects of the present invention may take the form of an entirely hardware implementation, an entirely software implementation (including firmware, resident software, micro-code, etc.) or an implementation combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Indeed, the included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the disclosure. Those skilled in the art will also appreciate that the features described above may be combined in various ways to form multiple implementations. As a result, the invention is not limited to the specific implementations described above, but only by the claims and their equivalents.

The wireless data network circuitry described above comprises computer hardware and software that form special-purpose wireless system circuitry to serve wireless user devices based on policies. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless system circuitry to serve wireless user devices based on policies.

Unless the context clearly requires otherwise, throughout the description and the claims, the words "comprise," "comprising," "such as," and "the like" are to be construed in an inclusive sense, as opposed to an exclusive or exhaustive sense, that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents. The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having operations, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating a wireless communication network, the method comprising:
   by enforcement points in the wireless communication network:
      applying access control policies for network slices in the wireless communication network to access attempts initiated by user equipment;
      generating Key Performance Indicators (KPIs) that characterize results of the access attempts for the network slices; and
      sending the KPIs to local policy sources in the wireless communication network;
   by the local policy sources in the wireless communication network:
      generating local Quality of Trust (QoT) values for the wireless communication network based on the KPIs, wherein the local QoT values indicate a level of security for corresponding ones of the network slices;
      generating updates to the access control policies based on the local QoT values;
      sending the updates to the enforcement points; and
      sending the KPIs to a global policy source;
   by the global policy source in the wireless communication network:
      generating a global QoT value for the network slices based on the KPIs, wherein the global QoT value indicates a global level of security for the wireless communication network;
      generating additional updates to the access control policies for the network slices based on the global QoT; and
      sending the additional changes to the enforcement points.

2. The method of claim 1, further comprising:
   by the enforcement points:
      updating the access control policies based on the updates and the additional updates received from the local policy sources and the global policy source; and
      applying the updated access control policies to new access attempts initiated by the user equipment.

3. The method of claim 1, wherein the local QoT values characterize a level of bot activity in the network slices and the global QoT value characterizes a global level of bot activity in the wireless communication network.

4. The method of claim 1, wherein one or more of the access control policies relate to authenticating the identity of the user equipment.

5. The method of claim 1, wherein one or more of the access control policies relate to authorizing network services for the user equipment.

6. The method of claim 1, wherein the KPIs comprise a metric relating to security of the wireless communication network.

7. The method of claim 1, wherein the KPIs comprise a metric relating to Quality of Service (QOS) of the wireless communication network.

8. The method of claim 1, wherein one or more of the updates or the additional update comprise a change to an attribute of the access control policies relating to one of: an identity of a requestor, a resource, an action taken by an enforcement point in response to the request, and an obligation on an enforcement point associated with the request.

9. The method of claim 8, wherein the obligation on the enforcement point of the enforcement points comprises generating a new KPI.

10. A method of operating a wireless communication network, comprising:
by a local policy source in the wireless communication network:
receiving, from enforcement points of the wireless communication network, Key Performance Indicators (KPIs), wherein the KPIs characterize results of access attempts to network slices in the wireless communication network by user equipment;
generating local Quality of Trust (QoT) values for the network slices based on the KPIs, wherein the local QoT values indicate a level of security for corresponding ones of the network slices;
generating updates to access control policies for each of the network slices based on the local QoT values;
sending the updates to the enforcement points; and
sending the KPIs to a global policy source;
by the global policy source in the wireless communication network:
generating a global QoT value for the wireless communication network based on the KPIs, wherein the global QoT value indicates a global level of security for the wireless communication network;
generating additional updates to the access control policies for the network slices based on the global QoT; and
sending the additional updates to the enforcement points.

11. The method of claim 10, wherein one or more of the access control policies relate to one or more of authenticating the identity of the user equipment and authorizing network services for the user equipment.

12. The method of claim 10, wherein the KPIs comprise a metric relating to security of the wireless communication network.

13. The method of claim 10, wherein the KPIs comprise a metric relating to Quality of Service (QOS) of the wireless communication network.

14. The method of claim 10, wherein one or more of the updates or additional updates comprises a change to an attribute of the access control policies relating to one of: an identity of a requestor, a resource, an action taken by an enforcement point in response to a request, and an obligation on an enforcement point associated with the request.

15. The method of claim 14, wherein the obligation on the enforcement point associated with the request comprises generating a new KPI for new access requests.

16. A computing apparatus comprising:
one or more computer-readable storage media;
one or more processors operatively coupled with the one or more computer-readable storage media; and
program instructions stored on the one or more computer-readable storage media that, when executed by the one or more processors, direct the computing apparatus to at least:
receive, from enforcement points of a wireless communication network, Key Performance Indicators (KPIs), wherein the KPIs characterize access attempts to network slices in the wireless communication network by user equipment;
generate local Quality of Trust (QoT) values for the network slices based on the KPIs, wherein the local QoT values indicate a level of security for corresponding ones of the network slices;
generate updates to access control policies based on the local QoT values;
send the updates to the enforcement points;
generate a global QoT value for the wireless communication network based on the KPIs, wherein the global QoT value indicates a global level of security for the wireless communication network;
generate additional updates to the access control policies for the network slices based on the global QoT value; and
send the additional changes to the enforcement points.

17. The computing apparatus of claim 16, wherein one or more of the updates or the additional updates comprise a change to an attribute of the access control policies relating to one of: an identity of a requestor, a resource, an action by an enforcement point in response to the access request, and an obligation on the enforcement point associated with the access request.

18. The computing apparatus of claim 17, wherein the obligation on the enforcement point of the enforcement points comprises generating a new KPI for new access requests.

19. The computing apparatus of claim 16, wherein the KPIs comprise a metric relating to network security of the wireless communication network.

20. The computing apparatus of claim 16, wherein the KPIs comprise a metric relating to Quality of Service (QOS) of the wireless communication network.

* * * * *